(12) United States Patent
Noffke et al.

(10) Patent No.: US 12,173,691 B2
(45) Date of Patent: Dec. 24, 2024

(54) OPERATION OF A WIND TURBINE USING OPTIMIZED PARAMETERS

(71) Applicant: Wobben Properties GmbH, Aurich (DE)

(72) Inventors: Nils Noffke, Aurich (DE); Ewout Lagerweij, Apeldoorn (NL); Daniel Schlote, Viernheim (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 0 days.

(21) Appl. No.: 17/847,018

(22) Filed: Jun. 22, 2022

(65) Prior Publication Data
US 2022/0412308 A1 Dec. 29, 2022

(30) Foreign Application Priority Data

Jun. 23, 2021 (EP) .................................. 21181226

(51) Int. Cl.
*F03D 7/02* (2006.01)
*H02P 9/10* (2006.01)
(Continued)

(52) U.S. Cl.
CPC .............. *F03D 7/028* (2013.01); *H02P 9/102* (2013.01); *F05B 2220/7068* (2013.01);
(Continued)

(58) Field of Classification Search
CPC ...... F03D 7/028; H02P 9/102; H02P 2101/15; H02P 2103/20; F05B 2220/7068; F05B 2270/333; F05B 2270/334
See application file for complete search history.

(56) References Cited

U.S. PATENT DOCUMENTS 9,263,980 B2 2/2016 Deng
2014/0203558 A1* 7/2014 Mandre .................. F03B 17/06
290/43
(Continued)

OTHER PUBLICATIONS

Yahia et al., "Differential evolution method-based output power optimisation of switched reluctance generator for wind turbine applications," *IET Renew. Power Gener.* 8(7):795-806, 2014. (12 pages).

*Primary Examiner* — Tulsidas C Patel
*Assistant Examiner* — Thomas K Quigley
(74) *Attorney, Agent, or Firm* — Seed IP Law Group LLP

(57) ABSTRACT

Provided is a method for controlling a wind turbine, in particular an electric generator of said wind turbine. The method includes an optimization during which a suitable operating parameter for controlling said wind turbine or generator thereof is determined, in particular in an iterative manner. The optimization includes providing a multidimensional space comprising a plurality of parameters; providing an objective function for said multidimensional space, e.g., a simplex has a shape of a triangle or a tetrahedron; and determining one parameter of said multidimensional space as a suitable operating parameter by applying said objective function to said multidimensional space, in particular in an iterative manner. The method includes selecting a suitable operating parameter as an operating parameter for said wind turbine or generator thereof; and operating said wind turbine or generator based on said operating parameter, in particular by controlling a converter connected to said generator.

19 Claims, 5 Drawing Sheets

(51) Int. Cl.
　　　*H02P 101/15*　　　(2016.01)
　　　*H02P 103/20*　　　(2016.01)

(52) U.S. Cl.
　　　CPC ... *F05B 2270/333* (2013.01); *F05B 2270/334* (2013.01); *H02P 2101/15* (2015.01); *H02P 2103/20* (2015.01)

(56) References Cited

U.S. PATENT DOCUMENTS

2019/0154000 A1　　5/2019　Hammerum et al.
2022/0195985 A1*　6/2022　Kragelund .............. H02P 9/105

* cited by examiner

OPERATION OF A WIND TURBINE USING OPTIMIZED PARAMETERS

BACKGROUND

Technical Field

The present invention refers to a method for controlling a wind turbine as well as such a wind turbine.

Description of the Related Art

In order to generate electrical power wind turbines comprise an electric generator, which is usually controlled via a converter, e.g., a back-to-back converter, connecting said electric generator with an electrical grid in order to provide the electrical power produced by said electric generator to said electrical grid.

Due to physical reasons, only certain step sizes for physical quantities like amplitude or phase angle are allowable for controlling said converter or said generator.

For example, large step sizes of phase angle or amplitude at higher currents may lead to large instantaneous current spikes destroying said converter or said generator.

BRIEF SUMMARY

In view of the above, an enhanced method for controlling an electric generator of a wind turbine is sought, in particular a method, which is independent of the topology of the generator and/or the converter of said wind turbine.

According to a first aspect, a method for controlling a wind turbine is proposed, in particular for an electric generator of said wind turbine. Said method comprising an optimization, in particular a mathematical optimization, during which a suitable operating parameter for controlling said wind turbine, in particular said electrical generator of said wind turbine, is determined, in particular in an iterative manner. Said optimization comprises the steps of: providing a multidimensional space comprising a plurality of parameters; providing an objective function for said multidimensional space, e.g., a simplex has a shape of a triangle or a tretrahedron; and determining one parameter of said multidimensional space as a suitable operating parameter by applying said objective function to said multidimensional space, in particular in an iterative manner. Said method for controlling further comprising the steps of: selecting a suitable operating parameter as an operating parameter for said wind turbine, in particular said electric generator of said wind turbine; and operating said wind turbine, in particular said electric generator of said wind turbine, based on said operating parameter, in particular by controlling a converter connected to said generator.

Thus, a method for controlling a wind turbine is proposed using an optimization in order to determine suitable operating parameters for a wind turbine, in particular the electric generator of a wind turbine.

The result of said optimization is a suitable operating parameter, which may be selected as an operating parameter of said wind turbine in order to operate said wind turbine.

Preferably, said operating parameter is for controlling said electric generator of said wind turbine, e.g., an amplitude or a phase angle of said electric generator via back-to-back converter connected to said electric generator. For example, said operating parameters are used to control an active rectifier which is part of a back-to-back converter connected to said electric generator.

Said optimization is based on a multidimensional space comprising a plurality of parameters and an objective function, e.g., a simplex. Thus, said optimization is based on a multidimensional space and an objective function.

In order to determine one parameter of said multidimensional space as a suitable operating parameter said objective function is applied to said multidimensional space, in particular in an iterative manner, e.g., by using a Nelder-Mead method. For example, said objective function is applied to said multidimensional space in an iterative manner finding a minimum in said multidimensional space, e.g., a noise minimum of said electric generator.

In an embodiment, a combination of multiple parameters is determined, for example phase angel and amplitude.

For this, said multidimensional space comprises at least two dimensions. Preferably, the number of dimensions is chosen based on the quantity of the operating parameters to be optimized. For example, a two-dimensional space is chosen in order to optimize a pair of parameters, e.g., amplitude and phase angle.

In one embodiment, only one optimization is run at a time.

In another embodiment, several optimizations are run parallel at a time for different parameters, e.g., one optimization for amplitude and phase angle and one optimization for rotor speed and pitch angle.

In addition or alternatively, said objective function is chosen based on the parameters to be optimized.

Preferably, said objective function is a simplex in shape of a triangle, in particular in case of a two-dimensional space, or a tetrahedron, in particular in case of a three-dimensional space. Moreover, said shape may also be chosen based on the parameters to be optimized.

For example, an optimization for two parameters, e.g., amplitude and phase angle, is sought and therefore, a two-dimensional space is chosen. Due to the fact, that the amplitude and phase angle may be expressed as a vector, a polar coordinate system may be chosen. Thus, a polar coordinate system is chosen as a multidimensional space, in particular as shown in FIG. 4A. Thus, the multidimensional space is a two-dimensional polar coordinate system having multiple discrete points forming a grid of circular shape with approximately equal sized triangular cells and each point comprising a coordinate for the amplitude and a coordinate for the phase angle. Said objective function in shape of a triangle is then applied to said system to find a suitable parameter, in particular as described herein.

Preferably, the method provided herein is used for higher harmonics of generator currents, in particular in addition to the normal current controller, preferably for a superimposed control.

In an embodiment, said optimization is running while said generator is rotating and/or generating electrical power.

Thus, said optimization is run during operation of said wind turbine, preferably in an iterative manner.

In particular, the proposed method is preferably run part time or full time during operation of said wind turbine, e.g., in a closed loop or feedback loop control. Preferably, also using a look-up table.

In an embodiment, said optimization is a mathematical and/or numerical optimization.

Thus, said optimization is based on a mathematical or numerical algorithm, e.g., for the problem of linear optimization.

One example for this is the so-called Nelder-Mead method, a numerical method used to find a minimum or a maximum of an objective function in a multidimensional space. However, also other algorithms may be used, e.g., another simplex algorithm.

In an embodiment, said multidimensional space is provided as a grid, in particular a circular grid, preferably having equal sized cells, e.g., of triangular shape.

In particular, said multidimensional space has a plurality of discrete points and said points are forming a grid.

Said grid is preferably of circular shape and/or with approximately equal sized triangular cells. One example for this is shown in FIG. 4A.

Preferably, each point of said grid comprises a multidimensional coordinates, e.g., two coordinates, for example amplitude and phase angle. In addition, the form of grid depends on the character of the coordinates, e.g., amplitude and phase angle leading to a circular shape or power and rotation speed leading to a rectangular or trapezoidal shape.

In another embodiment, said grid comprises an area of unstable parameters, which in particular are declared as forbidden area so that the objective function is not allowed and/or able to settle with said area.

By using said forbidden area, a plurality of parameters may be dismissed on purpose whenever needed.

For example, if specific parameters lead to noise due to the prevailing wind, said specific parameters may be declared as forbidden. Thus, those specific parameters cannot be determined as suitable operating parameters.

In another embodiment, said grid comprises a mesh topology depending on the operating parameter. For example, said mesh topology may be of triangles or squares or other shapes, in the same or other size(s).

In some cases, a mesh of triangles may be advantageous. In other cases, other shapes may be advantageous.

In an embodiment, said objective function is a simplex and has preferably the shape of a triangle.

In an embodiment, said determining is carried out by a direct search method, in particular an Nelder-Mead method.

In an embodiment, said operating parameter is a minimum or maximum of said objective function.

In an embodiment, said optimization comprises at least a first and a second mode, each having a different count for points to be measured.

In an embodiment, a reference for the optimization is also measured, e.g., a base line, and the result of said optimization is compared to said reference in order to quantify said optimization. The result of this comparison may then be used for further optimization, e.g. other wind turbine parameters like power output. The lower said count, the faster the algorithm of the optimization.

For example, the objective function has the shape of a triangle and therefore comprises three points. In this case, the first mode may have a count of one and the second mode may have a count of three and therefore, in the first mode only one point is newly measured every time whereas in the second mode all three points are newly measured every time. In this case, the first mode is much faster than the second mode and therefore, the first mode may be called fast mode and the second mode may be called slow mode. In an embodiment, said optimization comprises at least a first and a second mode, and the optimization further comprises the step: choosing the first or the second mode depending on power ramp.

Accordingly, said optimization is toggleable between a first and second mode, wherein the toggle may be performed based on a power ramp of the wind turbine.

For example, the grid operator demand power within the electrical supply grid and sends a request to the wind turbine. Then, the wind turbine may ramp up his power. If this ramp exceeds a predefined power-over-time-factor, the algorithm may switch into another mode, e.g., from a slow mode into a fast mode.

In an embodiment, said suitable operating parameter is not selected as the operating parameter for said wind turbine when said suitable operating parameter would lead to an operating current above a certain threshold.

Therefore, said optimization comprises at least one limit or threshold and/or may not exceed certain values.

For example, if said optimization is used for varying the amplitude and/or the phase angle of a current within said electrical generator, e.g., an operating current of said electric generator, in order to reduce a ripple torque of said generator, a threshold may be set at twenty percent of the base current. Thus, the optimization may only vary the parameters in range of the electric power produced by the electric generator.

In an embodiment, said optimization uses a look-up table to store measure points.

According to second aspect, a wind turbine is proposed comprising an electric generator, which is controlled by a method as described herein.

Said wind turbine may also comprises a tower and a nacelle.

Preferably, on said nacelle is an aerodynamic rotor having a hub with three rotor blades and a spinner.

During operation, said aerodynamic rotor is set in a rotating motion by the wind and thereby driving a generator in said nacelle.

In an embodiment, said electric generator is a, in particular permanent magnet synchronous, generator with an active rectifier and said active rectifier is designed to control a current of said generator, in particular an amplitude and/or a phase angle of said current.

For example, said generator is connected to an active rectifier, which is connected to an inverter, which is connected to an electrical supply grid.

Said active rectifier and said inverter are preferably arranged as an back-to-back converter.

In an embodiment, said wind turbine further comprises a wind turbine control unit (e.g., wind turbine controller) having at least one optimization module, preferably with a look-up table for storing measured points.

In order to control said wind turbine said wind turbine control unit may receive multiple signals, e.g., a measured phase current of said generator, a line voltage between said active rectifier and said inverter and/or a power demand value for controlling the power output of said wind turbine.

In an embodiment, said wind turbine further comprises a sensor placed on a hub of said wind turbine.

Preferably, said sensor is an accelerometer.

In an embodiment, said sensor is designed to detect a vibration or a sound of said wind turbine and/or said electric generator and/or a wind turbine blade.

Thus, a sound of said wind turbine may be used as a predetermined criteria for optimizing the operating parameters of said wind turbine, in particular by a method described herein.

BRIEF DESCRIPTION OF THE SEVERAL VIEWS OF THE DRAWINGS

With reference to the appended drawings, below follow a more detailed description of embodiments of the invention cited as examples.

In the drawings.

DETAILED DESCRIPTION

Figure 1:
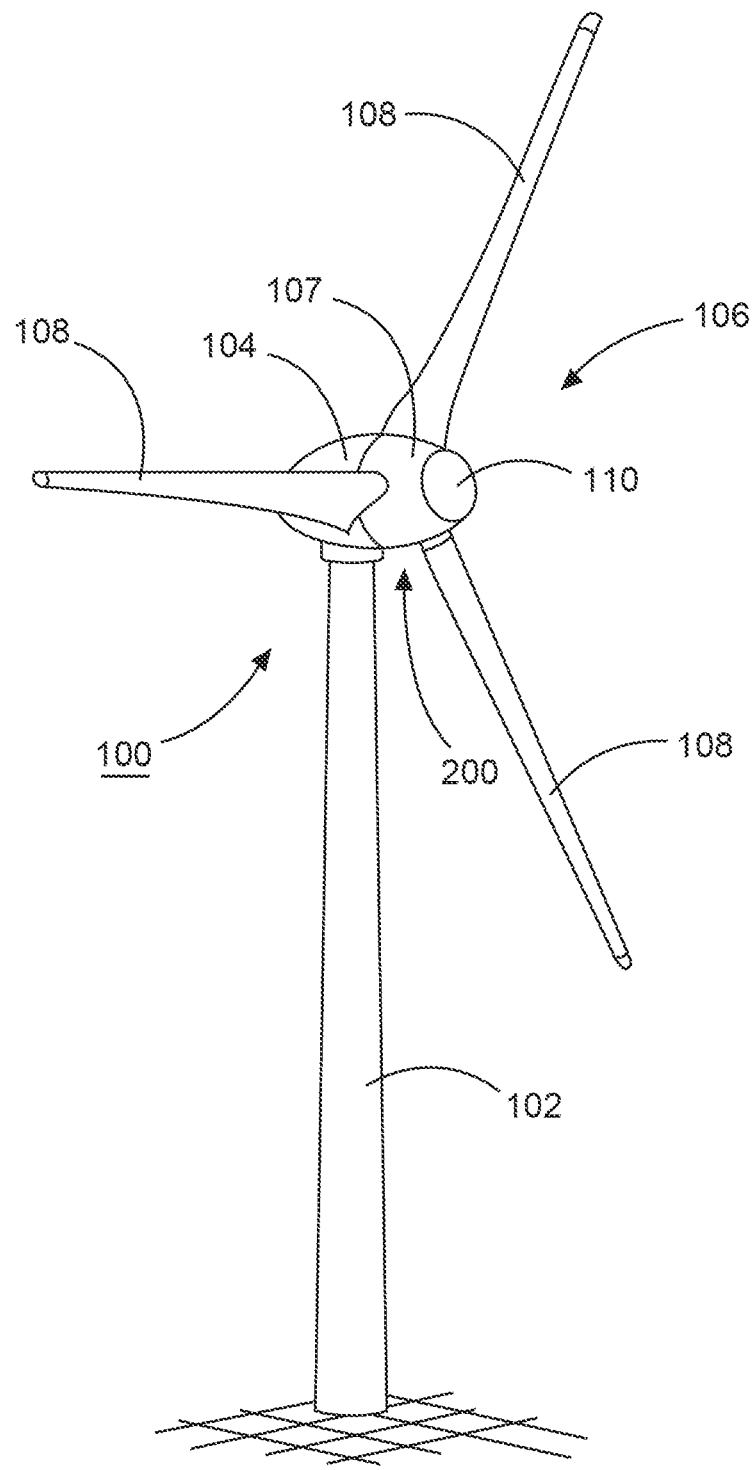
FIG. 1 shows a wind turbine in an embodiment.

FIG. 1 shows a wind turbine 100.

Said wind turbine 100 comprises a tower 102 and a nacelle 104. Arranged on said nacelle 104 is an aerodynamic rotor 106 having a hub 107 with three rotor blades 108 and a spinner 110.

During operation, said aerodynamic rotor 106 is set in a rotating motion by the wind and thereby driving a generator in said nacelle 104.

Said generator is preferably a synchronous generator with an active rectifier, designed to control a current of said generator.

Said wind turbine 100 also comprises a sensor 200, in particular an accelerometer, placed in said hub 107, in particular on an inner side of said hub 107 next to a pitch bearing or a stator ring of the generator.

Said sensor 200 is designed for detecting a vibration or a sound of said wind turbine 100 and/or said electric generator and/or a wind turbine blade 108.

Figure 2:
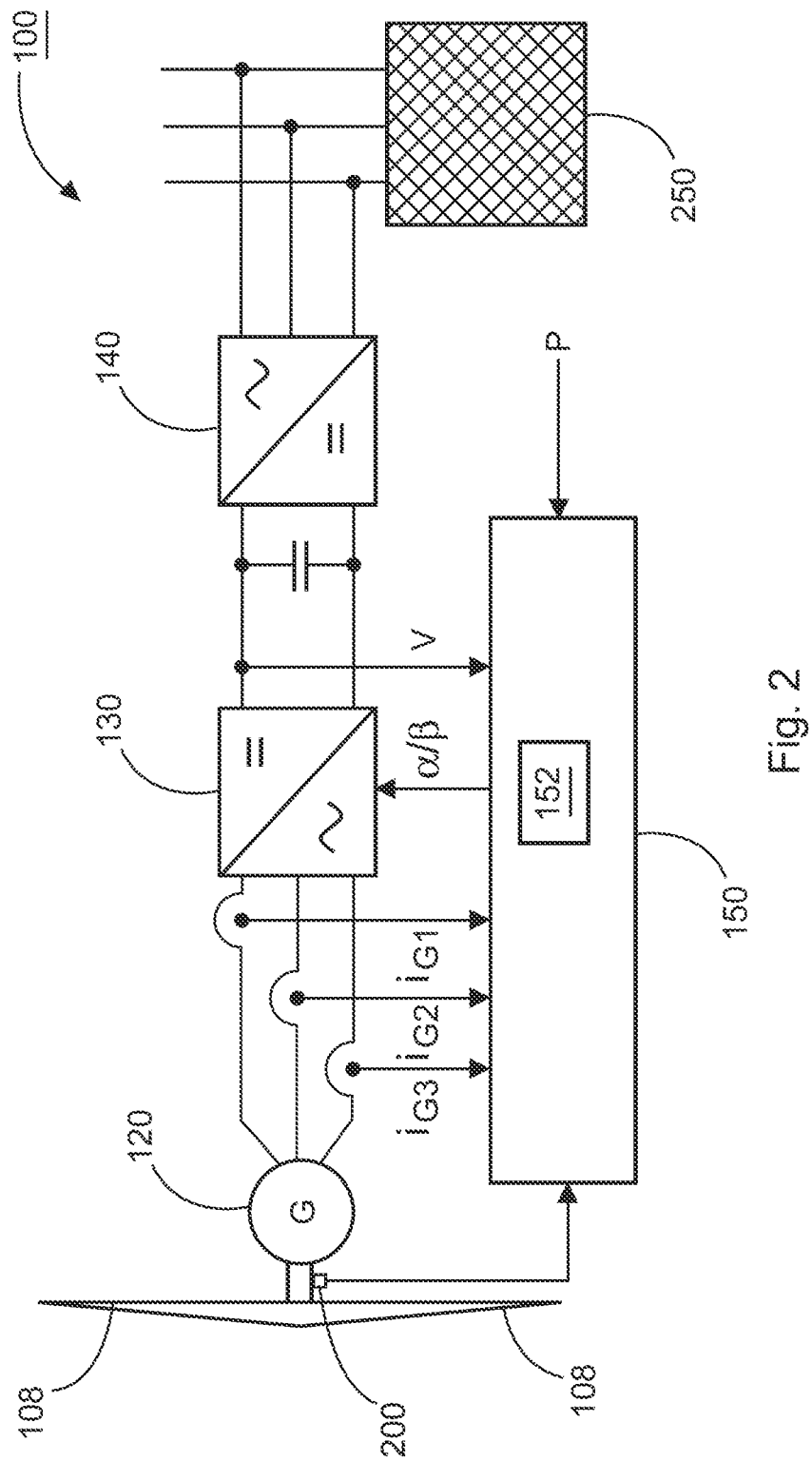
FIG. 2 shows another view of said wind turbine.

FIG. 2 shows another view of said wind turbine 100, in particular as shown in FIG. 1.

Said rotor blades 108 are mechanically connected to said generator 120 via said hub 107.

Preferably, said generator 120 is a permanent magnet synchronous generator.

Said generator 120 is connected to an active rectifier 130, which is connected to an inverter 140, which is connected to an electrical supply grid 250.

Said active rectifier 130 and said inverter 140 are preferably arranged as an back-to-back converter.

Said wind turbine 100 also comprises a wind turbine control unit (e.g., wind turbine controller) 150, which is designed to control said wind turbine 100, and in particular said active rectifier 130.

In order to control said wind turbine 100 said wind turbine control unit 150 may receive multiple signals, e.g., a measured phase current $i_{g1}$, $i_{g2}$, $i_{g3}$ of said generator 120, a line voltage V between said active rectifier 130 and said inverter 140 and/or a power demand value P for controlling the power output of said wind turbine.

Said wind turbine control unit 150 is also designed to control said active rectifier 130 via a signal line in order to meet a specific operating point of said wind turbine or generator.

Moreover, said wind turbine control unit 150 is designed to control said active rectifier 130 using $\alpha/\beta$-coordinates, e.g., for a current, in order to meet a specific operating point of said wind turbine and/or generator.

Figure 3:
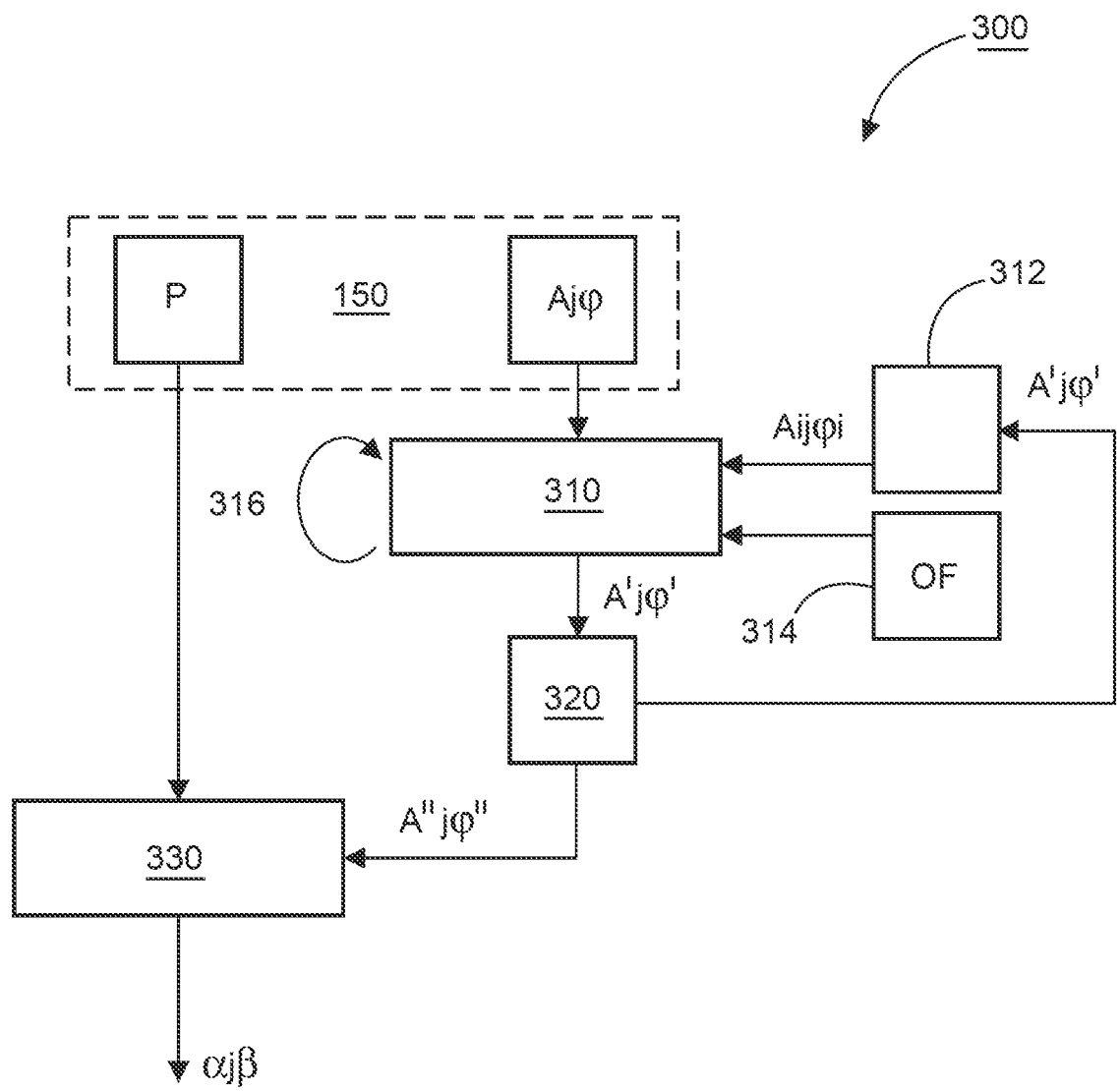
FIG. 3 shows a flowchart of the proposed method.

Said wind turbine control unit 150 may also comprise an optimization module 152 designed to run the herein-described optimization, e.g., as shown in FIG. 3.

FIG. 3 shows a flowchart 300 of a method for controlling an electric generator of a wind turbine, e.g., as shown in FIG. 1 and/or FIG. 2, comprising an optimization.

Said electric generator may be controlled via an active rectifier and said active rectifier is controlled via a power demand value P which is transformed into $\alpha/\beta$-coordinates, which are used to control said active rectifier. Hence, said electric generator is controlled via a power demand value P using $\alpha/\beta$-coordinates in order to drive an active rectifier controlling said electric generator.

In order to operate said generator properly also different operating parameters leading to different operating points are used, e.g., amplitude A and/or phase angle $\varphi$, in particular for controlling a generator current.

Any parameters/operating parameters needed for controlling said wind turbine may be provided by a wind turbine control unit 150, as shown in FIG. 2.

During operation of said wind turbine, an optimization 310 as described herein is carried out.

Said optimization 310 is a mathematical optimization, in particular for operating parameters, e.g., amplitude A and phase angle $\varphi$, during which a suitable operating parameter A', $\varphi'$ for controlling said wind turbine is determined, in particular in an iterative manner.

In the given example, the amplitude A and the phase angle $\varphi$ are the operating parameters of the generator of the wind turbine.

Figure 4A:
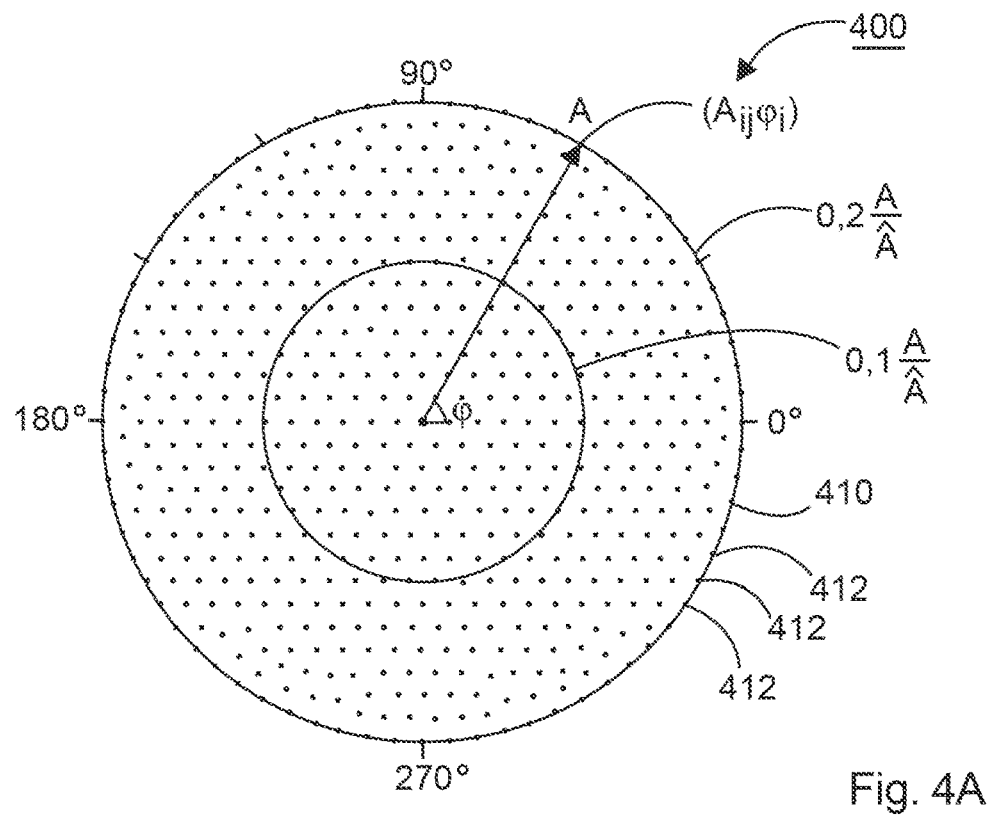
FIG. 4A illustrates a multidimensional space.

In a first step 312 of the optimization, a multidimensional space is provided comprising a plurality of discrete operating points of said generator, e.g., as shown in FIG. 4A.

In a next step 314 of the optimization, an objective function for said multidimensional space is provided, e.g., a simplex or simplex-algorithm, in particular a Nelder-Mead method.

In a next step 316, the objective function 314 is applied to the multidimensional space 312 in an iterative manner for determining at least one parameter A, $\varphi$ of said multidimensional space as a suitable operating parameter A', $\varphi'$.

Said suitable operating parameter A', $\varphi'$ is then selected in a next step 320 and applied to a controller, e.g., for controlling 330 an active rectifier.

Thus, the wind turbine is controlled based on the selected suitable operating parameter A', $\varphi'$ parameters as operating parameter A'', $\varphi''$.

In an embodiment, the suitable operating parameter A', $\varphi'$ may also be used to update the multidimensional space, in particular the plurality of parameters $A_i$, $\varphi_i$.

FIG. 4A shows a multidimensional space 400, in particular as used in the optimization as shown in FIG. 3.

The multidimensional space 400 has multiple discrete points 412 and is in form of a two-dimensional polar coordinate system forming a grid of circular shape with approximately equal sized triangular cells.

Each discrete point 412 comprises a coordinate for the Amplitude $A_i$ and a coordinate for the phase angle $\varphi_i$ describing one operating point of said wind turbine, in particular the electric generator of said wind turbine.

By applying an objective function to said multidimensional space 400, a point 412 within said multidimensional space 400 may be sought having suitable parameters.

For determining whether parameters are suitable or not, a predetermined condition may be used, e.g., noise of the generator using a microphone with the hub of said wind turbine.

By using noise as a predetermined condition, the proposed method may be used to lower the noise of the generator and/or the wind turbine.

However, also other predetermined conditions may be used such as rotational speed of the generator, heat within said generator, mechanical disturbances, such as torque ripple, and further more.

Figure 4B:
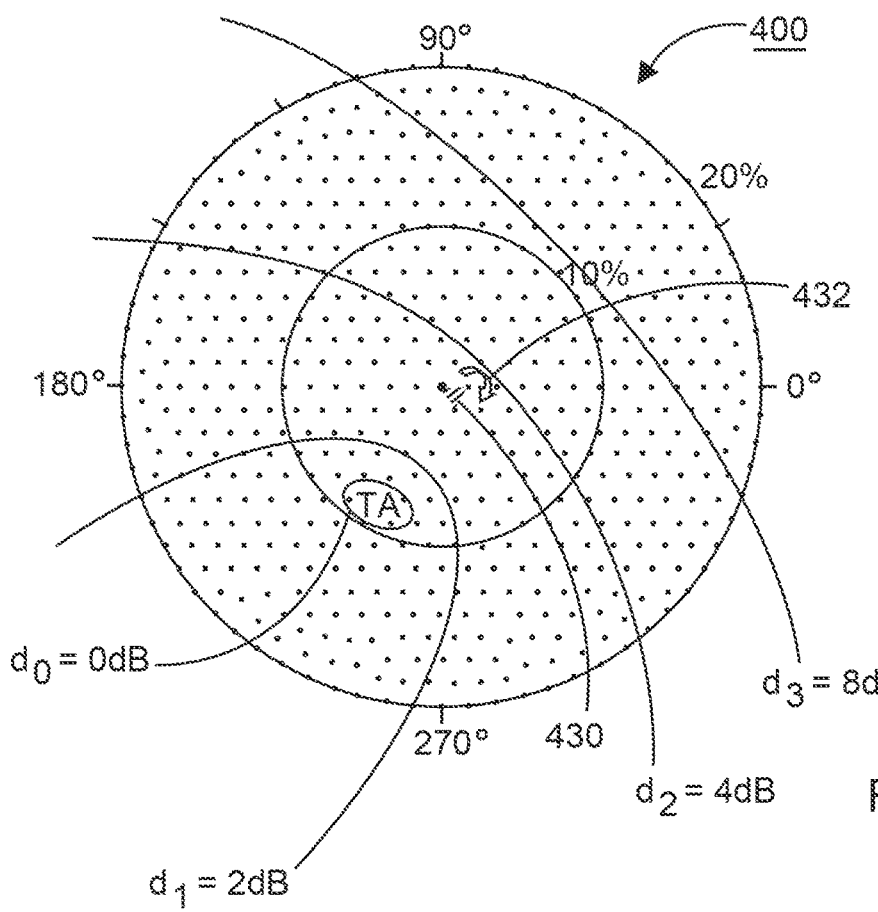
FIG. 4B illustrates a multidimensional space during optimization.

FIG. 4B shows a multidimensional space 400 during optimization, in particular as shown in FIG. 3, using a predetermined condition, in particular noise.

The multidimensional space 400 is as shown in FIG. 4A.

In addition, the objective function OF is applied to said multidimensional space 400. This can be illustrated by the triangle 430.

Due to the objective function OF, a suitable parameter A', φ' is sought. This may be illustrated by the triangle 430 moving (arrow, 432).

In the given example, the noise of the generator is chosen as a predetermined condition. The noise of the generator is illustrated by lines d0, d1, d2, d3 each of the same noise.

The objective function will lead the triangle 430 to move into the target area TA referencing to the lowest noise of the generator. Hence, an Amplitude and a phase angle φ with the target area will be determined as a suitable parameter A', φ' leading to low noise of said generator.

Figure 5:
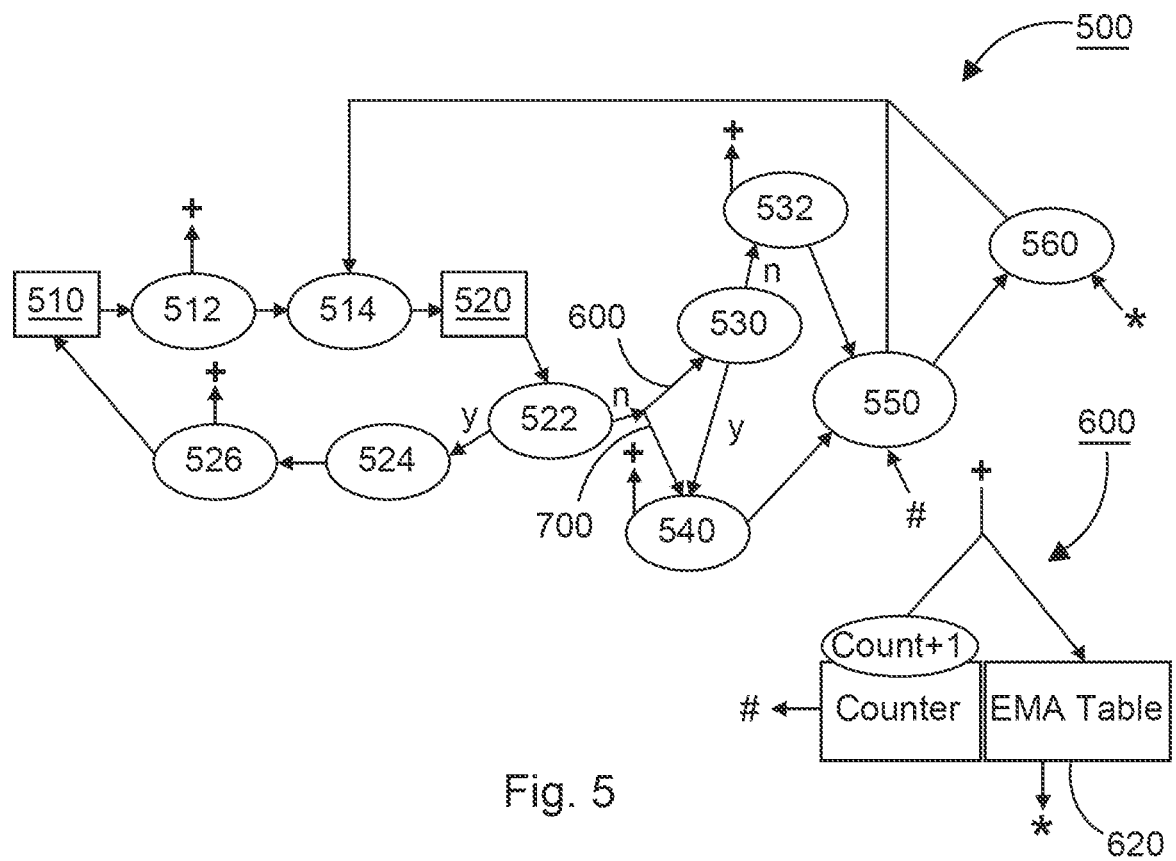
FIG. 5 shows a flow chart of the optimization.

FIG. 5 shows a flow chart 500 of the optimization 310, as shown in FIG. 3, in particular one embodiment of the step of: determining one parameter by applying said objective function to said multidimensional space, in particular in an iterative manner.

In this embodiment, a Nelder-Mead method is used to apply said objective function to said multidimensional space. Also, said Nelder-Mead method comprises a simplex having the shape of a triangle.

Hence, a numerical method is used to determine suitable, in particular optimal, operating parameter for controlling said wind turbine, in particular said electrical generator of said wind turbine.

In a first step 510, said optimization 310 is started.

In a next step 512, all points of the objective function are measured, in particular all three points of the triangle 430, as shown in FIG. 4B.

In a next step 514, a reflection of the worst point(s) of the measured points is performed. In this case, a reflection of the worst point of the triangle is performed according to the Nelder-Mead method.

Said reflection leads to a new triangle 520.

In a next step 522, it is checked whether a reference measurement is needed or not.

If so (y), said triangle is forced to the center point in a next step 524 and said center point is validated by measuring in a further step 526 or several furthers steps, e.g., by measuring five times. The amount of further steps depends on the allowed step size. After setting said center point, said optimization is started again 510.

If not so (n), and depending on the optimization mode, namely fast mode 600 or slow mode 700, new point(s) are measured.

In fast mode, it is checked if/whether said triangle does not move or not, in a first step 530. Said triangle is considered moving, if the last few triangle of the optimization have moved or not. If said last few triangle movements were not the same, only one new point is measured in further step 532. If said last few triangle movements were the same, the triangle is considered not moving and therefore, all points, in particular all three points, were measured in a next step 540.

In slow mode, all points, in particular all three points, were measured in a next step 540.

After measuring new point(s), it is checked weather or not a predetermined criteria is met, e.g., a threshold number of a counter, in a next step 550.

If said predetermined criteria is reached, a suitable operating parameter may be found and be selected as an operating parameter in a next step 560.

If said predetermined criteria is not reached, said reflection of the work points(s) of step 514 is repeated, followed by the same steps as described above and repeated until said predetermined criteria is met.

Therefore, said reflection and checking if said triangle is moving is performed in an iterative manner until said predetermined criteria is met.

Thus, said algorithm also comprises the steps of: measuring all needed points for the objective function. In this case: all three points of the triangle.

During optimization, different measurements are performed leading to new points and said new points may be stored in a look-up table (e.g., memory) 700. This is indicated by the (+) in the flow chart.

Said look-up table 700 may also comprise a counter 710, which is used if the predetermined criteria is a threshold number. This is indicated by the (#) in the flow chart.

Said look-up table 700 may also comprise a table 720 for an exponential moving average, which may be used to validate weather a parameter is suitable or not. This is indicated by the (*) in the flow chart.

Figure 6:
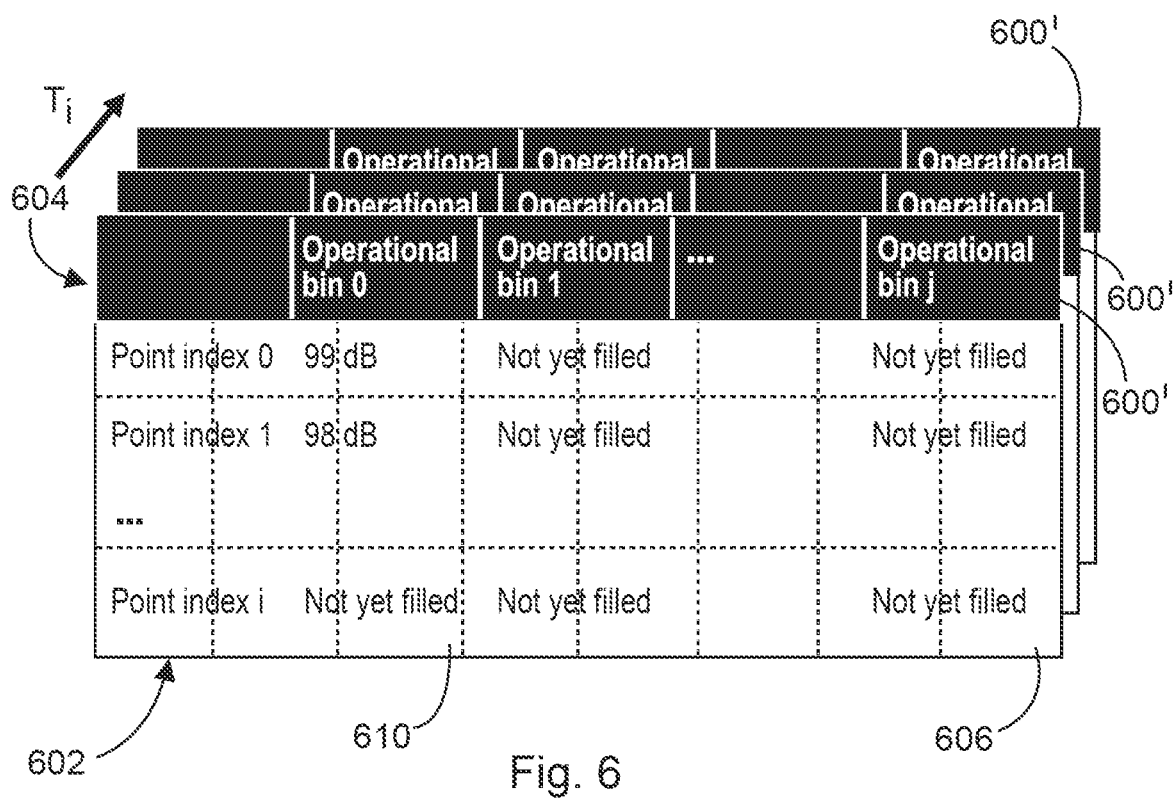
FIG. 6 shows a look-up table.

FIG. 6 shows a look-up table 600, which is preferably used within the herein-described optimization.

Said loop-up table may be used to keep count of the measured points, as described above, in particular in FIG. 5.

Said look-up table 600 may comprises multiple tables 600' each having a plurality of columns 602 and rows 604. The multiple tables 600' are used for different temperatures Ti within said generator.

Said columns 602 are set for a first operating parameter and said rows 604 are set for a second operating parameter.

During operation the cells 610 of the look-up table 600 may be filled with measured values, e.g., noise, corresponding to a predetermined criteria, in particular by using the first and second operating parameter.

In one example, the first operating parameter is the amplitude and the second operating parameter is the phase angle, and the corresponding criteria is noise is measured via microphone in the nacelle.

Preferably, the cells 610 of said look-up table are update by using an exponential moving average (EMA).

More preferably, said operating parameters are binned.

REFERENCE CHARACTER LIST 100 wind turbine
102 tower of said wind turbine
104 nacelle of said wind turbine
106 aerodynamic rotor of said wind turbine
107 hub of said wind turbine
108 rotor blade of said wind turbine
110 spinner of said wind turbine
120 generator, in particular a permanent magnet synchronous generator
130 active rectifier of said wind turbine
140 inverter of said wind turbine
150 wind turbine control unit of said wind turbine
152 optimization module
200 sensor, in particular accelerometer
250 electrical supply grid
300 scheme of the proposed method
310 run the optimization
320 selecting suitable operating parameters
330 controlling an active rectifier 400 multidimensional space
410 grid
412 discrete points of said grid
414 triangular cells
420 parameters
430 triangle
A amplitude
φ phase angle
d0, d1, . . . lines of noise in dB
TA target area
Ti temperature
$i_{g1}$ generator current of a first phase
$i_{g2}$ generator current of a second phase
$i_{g3}$ generator current of a third phase
y yes
n no The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling an electric generator of a wind turbine, comprising:
performing an optimization to determine a first operating parameter for controlling the electric generator of the wind turbine, performing the optimization including:
providing a multidimensional space comprising a plurality of parameters;
providing an objective function for the multidimensional space, the objective function having a shape that occupies an area of the multidimensional space;
iteratively applying the objective function to the multidimensional space to cause the shape of the objective function to reach a target area of the multidimensional space, wherein an iteration of applying the objective function to the multidimensional space causes the objective function to move in the multidimensional space; and
after iteratively applying the objective function to the multidimensional space, determining one parameter of the multidimensional space within the target area as the first operating parameter;
selecting the first operating parameter as an operating parameter for the electric generator of the wind turbine; and
operating the wind turbine, based on the operating parameter by controlling a converter connected to the electric generator of the wind turbine.

2. The method for controlling the wind turbine according to claim 1, wherein controlling the wind turbine includes controlling the electric generator of the wind turbine.

3. The method for controlling the wind turbine according to claim 1, wherein the objective function for the multidimensional space is a simplex that is triangle-shaped or tetrahedron-shaped.

4. The method for controlling the wind turbine according to claim 1, comprising:
performing the optimization while the electric generator is rotating and/or generating electrical power.

5. The method for controlling the wind turbine according to claim 1, wherein the optimization is a mathematical optimization and/or numerical optimization.

6. The method for controlling the wind turbine according to claim 1, wherein the multidimensional space is provided as a circular grid having equal sized cells.

7. The method for controlling the wind turbine according to claim 6, wherein the equal sized cells have a triangular shape.

8. The method for controlling the wind turbine according to claim 1, comprising:
determining the one parameter of the multidimensional space using a direct search method or an Nelder-Mead method.

9. The method for controlling the wind turbine according to claim 1, wherein the operating parameter is a minimum or a maximum of the objective function.

10. The method for controlling the wind turbine according to claim 1, wherein the optimization has at least a first mode and a second mode, and the first and second modes each having each having a different number of points that are measured.

11. The method for controlling the wind turbine according to claim 10, comprising:
selecting the first mode or the second mode depending on a power ramp.

12. The method for controlling the wind turbine according to claim 1, comprising:
determining whether the first operating parameter results in an operating current above a threshold; and
in response to the first operating parameter resulting in the operating current above the threshold, refraining from selecting the first operating parameter as the operating parameter for the wind turbine.

13. The method for controlling the wind turbine according to claim 1, wherein performing the optimization includes:
storing measurement points in a look-up table.

14. A wind turbine, comprising:
the electric generator that is controlled according to the method as claimed in claim 1.

15. The wind turbine according to claim 14, wherein the electric generator is a permanent magnet synchronous having an active rectifier, and wherein said active rectifier is configured to control a current of the electric generator.

16. The wind turbine according to claim 15, wherein the active rectifier is configured to control an amplitude and/or a phase angle of the current of the electric generator.

17. The wind turbine according to claim 14, comprising:
a wind turbine controller configured to store measurement points.

18. The wind turbine according to claim 17, comprising:
a sensor positioned on a hub of the wind turbine.

19. The wind turbine according to claim 18, wherein the sensor is configured to detect a vibration or a sound of the wind turbine, the electric generator and/or a wind turbine blade.

* * * * *